US012661573B2

(12) United States Patent
Treccagnoli

(10) Patent No.: US 12,661,573 B2
(45) Date of Patent: Jun. 23, 2026

(54) SKATEBOARD MOUNTABLE ILLUMINATING DEVICE

(71) Applicant: Robert Treccagnoli, Shirley, NY (US)

(72) Inventor: Robert Treccagnoli, Shirley, NY (US)

( * ) Notice: Subject to any disclaimer, the term of this patent is extended or adjusted under 35 U.S.C. 154(b) by 269 days.

(21) Appl. No.: 18/386,679

(22) Filed: Nov. 3, 2023

(65) Prior Publication Data

US 2025/0144504 A1 May 8, 2025

(51) Int. Cl.

| | |
|---|---|
| ***A63C 17/26*** | (2006.01) |
| ***A63C 17/01*** | (2006.01) |
| ***F21S 41/663*** | (2018.01) |
| ***F21V 21/088*** | (2006.01) |

(52) U.S. Cl.

CPC ............ *A63C 17/26* (2013.01); *A63C 17/012* (2013.01); *F21S 41/663* (2018.01); *F21V 21/088* (2013.01); *A63C 2203/14* (2013.01)

(58) Field of Classification Search

CPC .......................... A63C 17/012; A63C 2203/14

See application file for complete search history.

(56) References Cited

U.S. PATENT DOCUMENTS

| | | | | | |
|---|---|---|---|---|---|
| 4,991,066 | A * | 2/1991 | McCowan | B60Q 1/34 362/540 |
| 6,646,547 | B2 * | 11/2003 | Chiu | G08B 5/004 36/137 |
| 9,290,143 | B2 * | 3/2016 | Arjona | A63C 17/012 |
| 9,604,125 | B2 * | 3/2017 | Page | A63C 17/26 |
| D812,257 | S | 3/2018 | Alvarado | |
| 10,578,258 | B1 | 3/2020 | Patton | |
| 10,688,377 | B1 * | 6/2020 | Fugel | A63C 17/26 |
| 11,465,704 | B2 * | 10/2022 | Hillman | A63C 17/012 |
| 2003/0185019 | A1 * | 10/2003 | Rogers | A63C 17/0093 362/545 |
| 2003/0201620 | A1 * | 10/2003 | Seelye | A63C 17/012 280/87.042 |
| 2005/0030746 | A1 * | 2/2005 | Goode | A63C 17/26 362/253 |
| 2008/0036165 | A1 * | 2/2008 | Reinson | A63C 17/015 280/87.042 |
| 2009/0236811 | A1 * | 9/2009 | Lewis | A63C 17/0093 362/459 |
| 2012/0092886 | A1 * | 4/2012 | Calhoun | A63C 17/26 362/459 |
| 2016/0296830 | A1 | 10/2016 | Turner | |
| 2017/0239555 | A1 | 8/2017 | Alvarado | |
| 2017/0326434 | A1 * | 11/2017 | Faeth | F16M 13/022 |

FOREIGN PATENT DOCUMENTS

| | | |
|---|---|---|
| WO | WO2014175920 | 10/2014 |

* cited by examiner

*Primary Examiner* — Brian L Swenson

(57) ABSTRACT

A skateboard mountable illuminating device for enhancing safety while skateboarding includes a set of brackets and a set of light emitters. Each bracket has a mounting hole positioned therein so that the bracket is mountable to an underside of a deck of a skateboard using a nut and a respective mounting bolt that is integral to the skateboard. The bracket upon mounting is positioned between the deck and a truck of the skateboard. Each light emitter is attached to a respective bracket and emits light either forwardly of the deck for illumination and increased visibility or rearwardly of the deck for increased visibility.

17 Claims, 8 Drawing Sheets

SKATEBOARD MOUNTABLE ILLUMINATING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to illuminating devices and more particularly pertains to a new illuminating device for enhancing safety while skateboarding. Skateboards often utilize roadways and traverse intersections, so increasing their visibility to drivers decreases chances of collision, particularly in conditions of low visibility. Additionally, skateboarders would benefit from an illuminating device that illuminates an area forward of their skateboards so as to avoid objects or defects in their paths that may cause falls.

(2) Description of Related Art Including Information Disclosed Under 37 CFR 1.97 and 1.98

The prior art relates to illuminating devices that are attachable to skateboards and may comprise light emitting diodes (LEDs) incorporated into risers of skateboards, LEDs attachable to undersides of decks of skateboards by adhesives, screws, or the like. Related prior art includes brackets which are mountable to lower surfaces of trucks of skateboards and to which light emitters may be attached. What is lacking in the prior art is a bracket having a downwardly projecting element to which a light emitter is attached and wherein the bracket can be mounted to a skateboard using the hardware that holds the truck to the deck.

BRIEF SUMMARY OF THE INVENTION

An embodiment of the disclosure meets the needs presented above by generally comprising a set of brackets and a set of light emitters. Each bracket has a mounting hole positioned therein so that the bracket is configured to be mounted to an underside of a deck of a skateboard using a nut and a respective mounting bolt that is integral to the skateboard. The bracket upon mounting is positioned between the deck and a truck of the skateboard. Each light emitter is attached to a respective bracket and is configured to emit light either forwardly of the deck for illumination and increased visibility or rearwardly of the deck for increased visibility.

Another embodiment of the disclosure includes a skateboard mounted illuminating system, which comprises a skateboard to which a skateboard mountable illuminating device, according to the disclosure above been mounted. Each light emitter of a set of light emitters is configured to emit light either forwardly of the deck for illumination and increased visibility or rearwardly of the deck for increased visibility.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
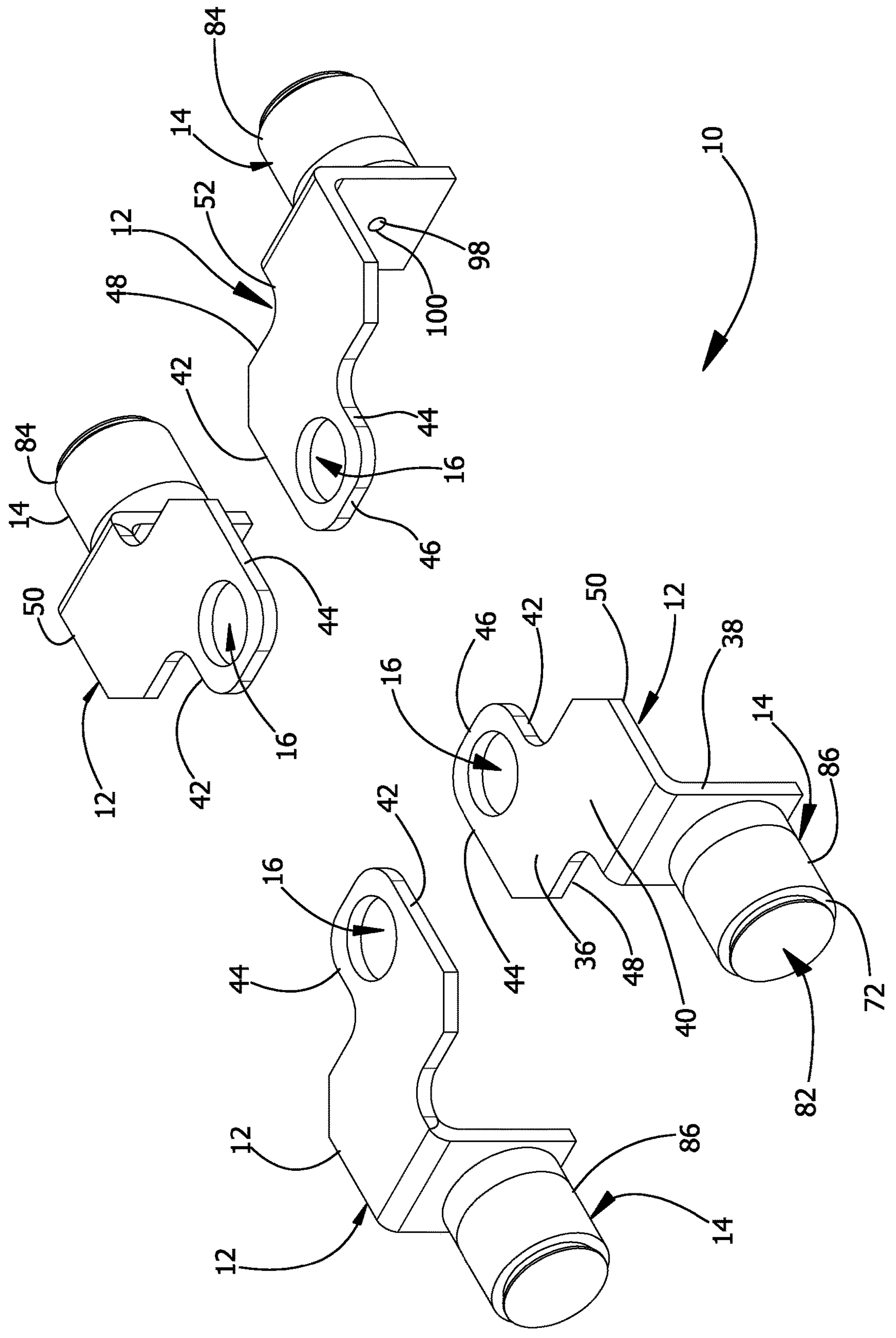
FIG. 1 is an isometric perspective view of a skateboard mountable illuminating device according to an embodiment of the disclosure.
Figure 2:
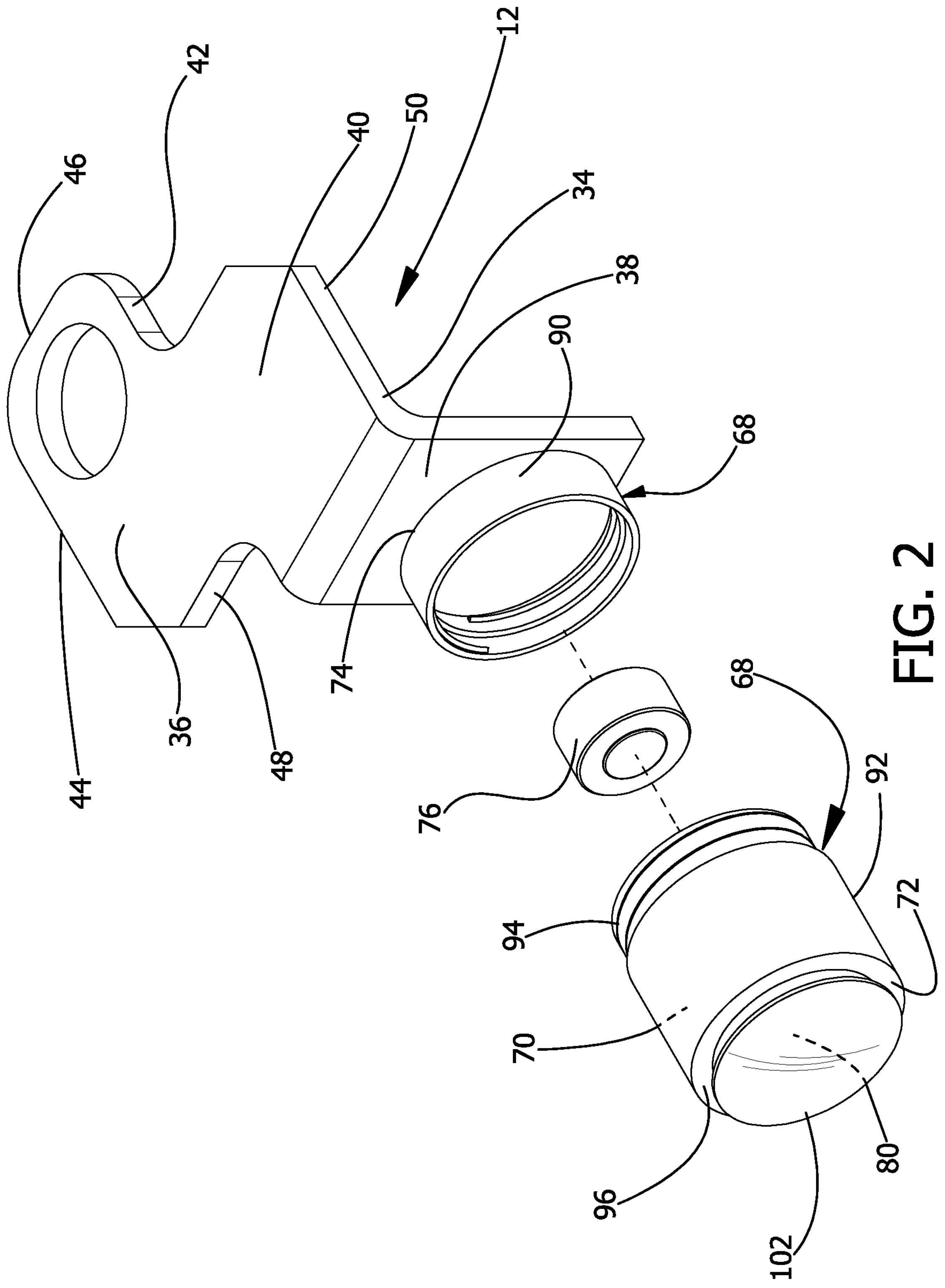
FIG. 2 is an exploded view of an embodiment of the disclosure.
Figure 3:
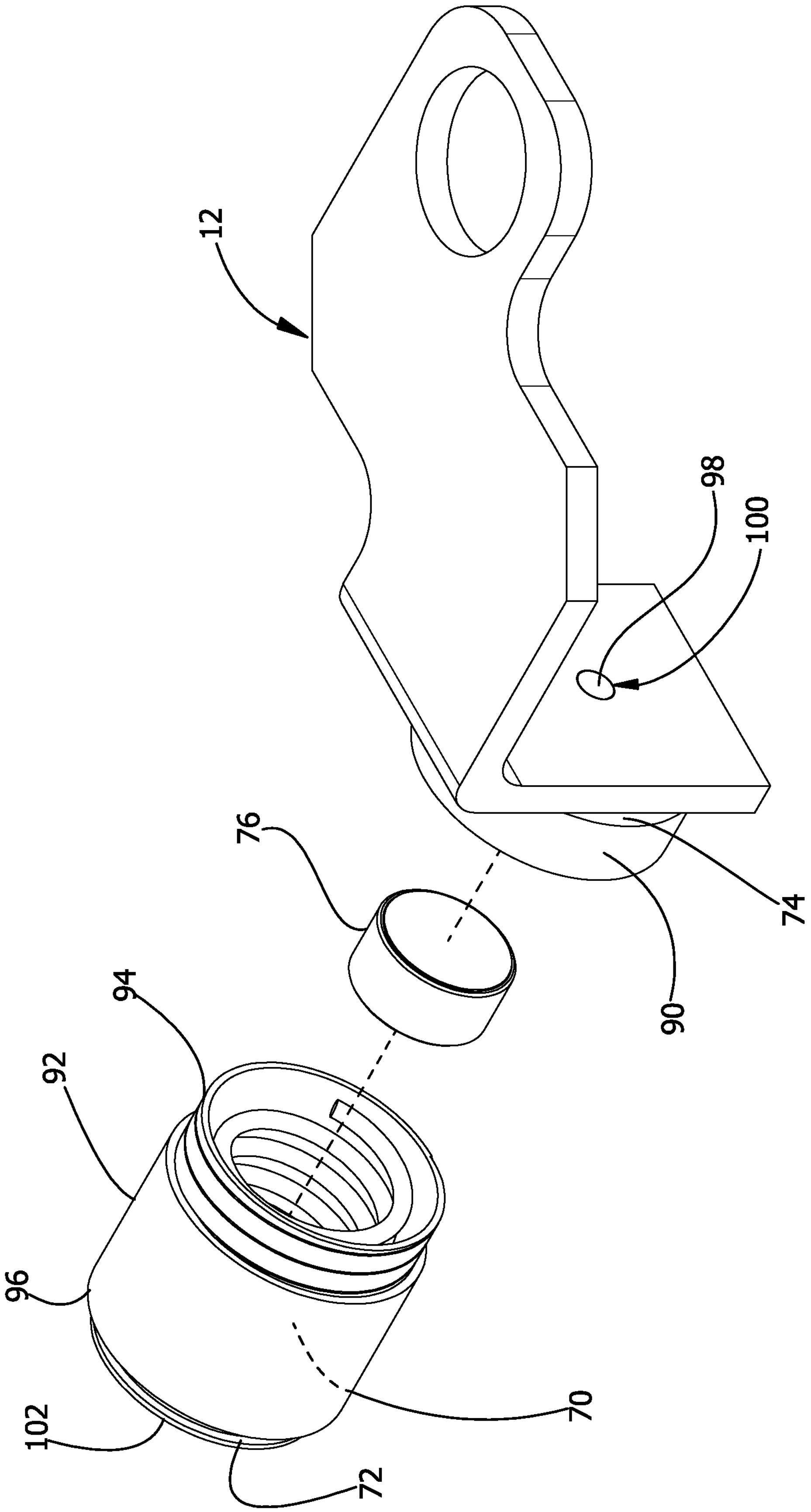
FIG. 3 is an exploded view of an embodiment of the disclosure.
Figure 4:
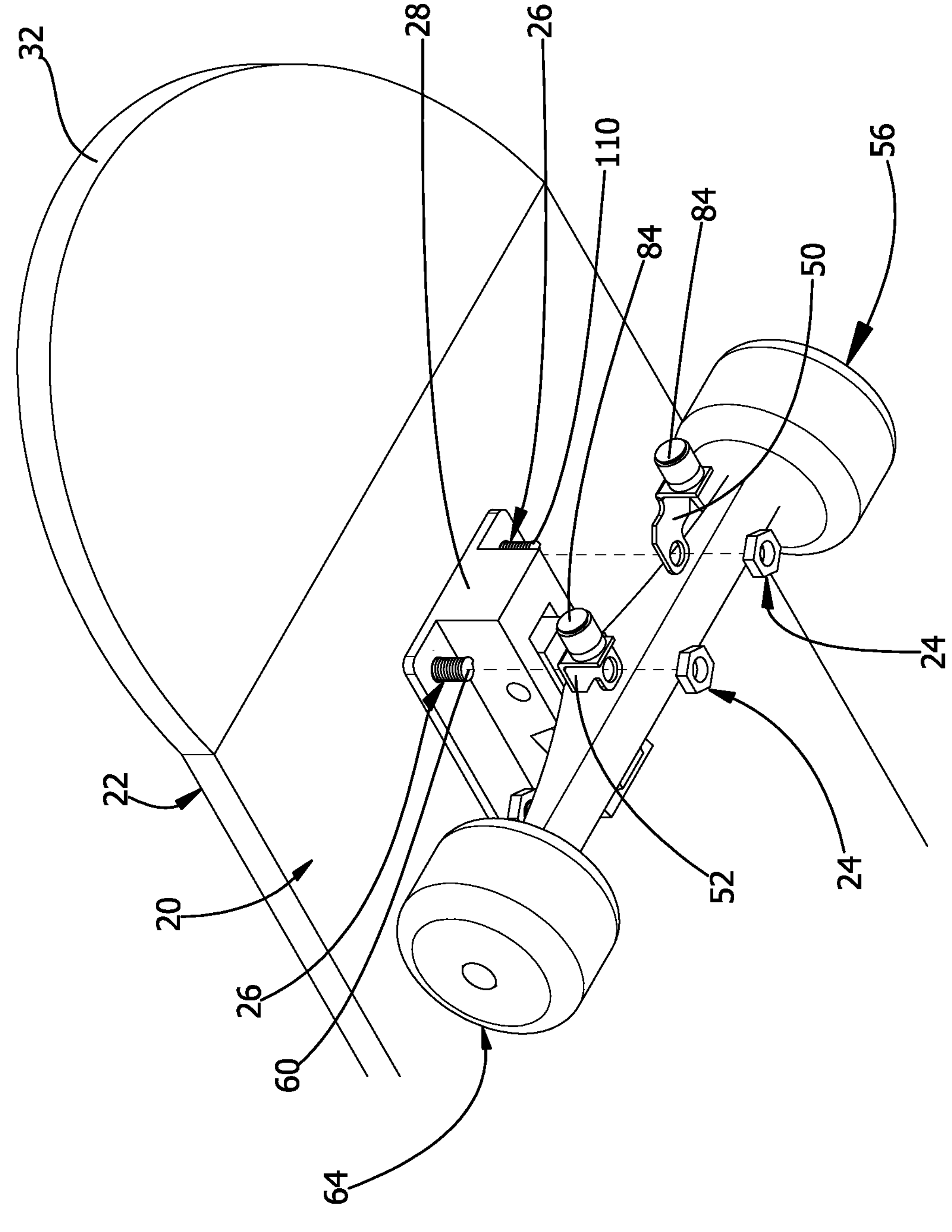
FIG. 4 is an exploded view of an embodiment of the disclosure.
Figure 5:
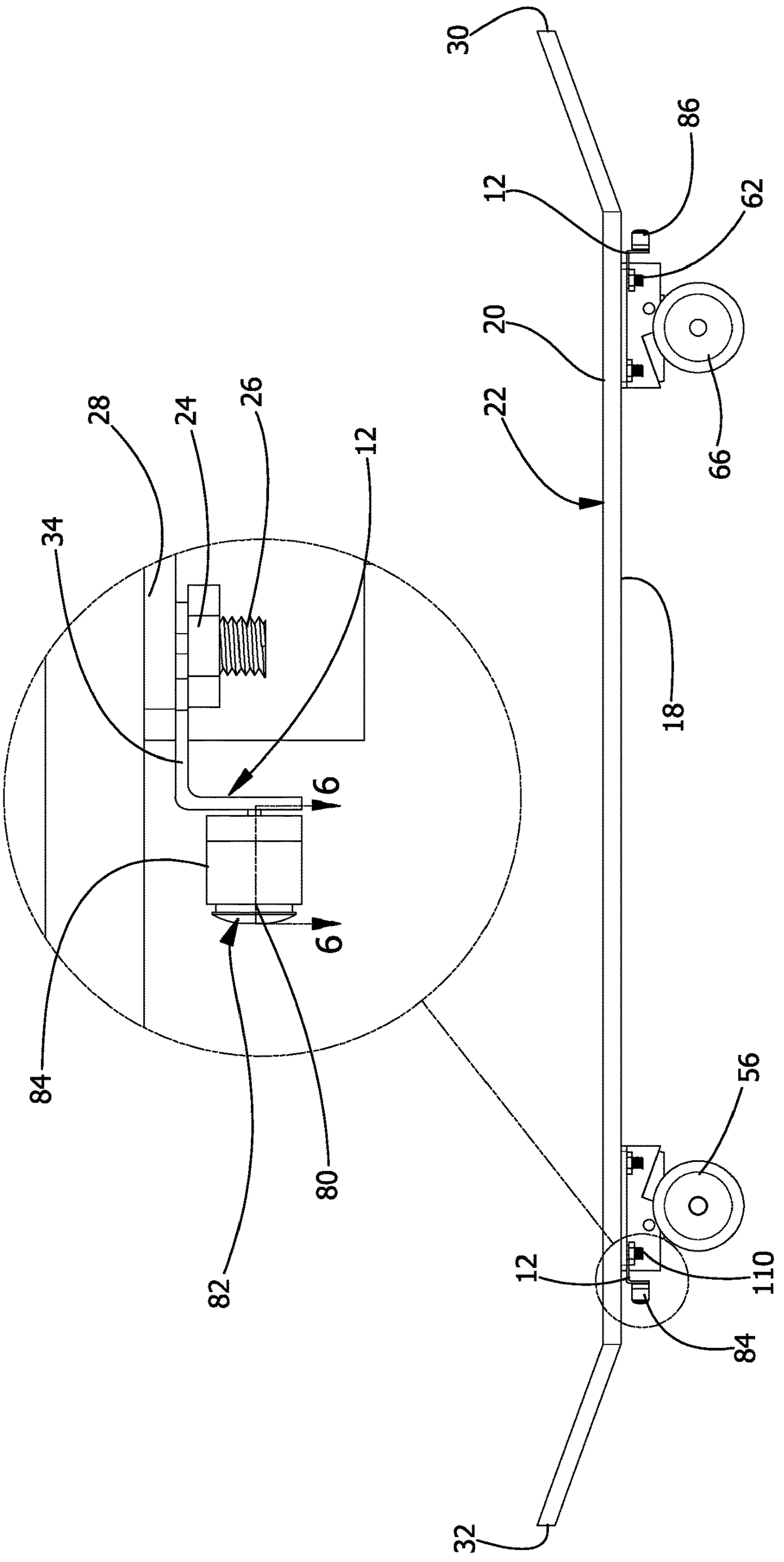
FIG. 5 is a side view of an embodiment of the disclosure.

With reference now to the drawings, and in particular to FIGS. 1 through 8 thereof, a new illuminating device embodying the principles and concepts of an embodiment of the disclosure and generally designated by the reference numeral 10 will be described.

As best illustrated in FIGS. 1 through 8, the skateboard mountable illuminating device 10 generally comprises a set of brackets 12 and a set of light emitters 14. Each bracket 12 has a mounting hole 16 positioned therein so that the bracket 12 is configured to be mounted to an underside 18 of a deck 20 of a skateboard 22 using a nut 24 and a respective mounting bolt 26 that is integral to the skateboard 22. The bracket 12 upon mounting is positioned between a truck 28 of the skateboard 22 and a nut 24. Each light emitter 14 is attached to a respective bracket 12 and is configured to emit light either forwardly of the deck 20 for illumination and increased visibility or rearwardly of the deck 20 for increased visibility.

The set of brackets 12 comprises four brackets 12 so that the deck 20 can be fitted with two brackets 12 extending toward a rear end 30 of the deck 20 and two brackets 12 extending toward a front end 32 of the deck 20. The present invention also anticipates one bracket 12 or two brackets 12 extending forwardly or rearwardly, or two brackets 12 extending one forwardly and one rearwardly. Also anticipated by the present invention is one bracket 12 extending forwardly and two brackets 12 extending rearwardly or one bracket 12 extending rearwardly and two brackets 12 extending forwardly.

The bracket 12 has a cross-sectional profile 34, which is substantially L-shaped. Each bracket 12 comprises a first piece 36 and a second piece 38 and may comprise a third piece 40. It should be understood that first piece 36, second piece 38 and third piece 40 are used for descriptive purposes and the bracket 12 may comprise a single element shaped as described below. The first piece 36 has a first lateral edge 42, a second lateral edge 44, a first end 46, and a second end 48. The mounting hole 16 is positioned in the first piece 36 proximate to the first end 46. The second piece 38 is attached to and extends substantially perpendicularly from the second end 48 and extends away from the deck 20 upon mounting of the bracket 12 to the deck 20. When the bracket 12 comprises the third piece 40, it is attached to and extends substantially coplanarly from a respective one of the first lateral edge 42 and the second lateral edge 44, with the second piece 38 being attached to and extending substantially perpendicularly from the third piece 40 distal from the first piece 36.

As is shown in FIG. 1, the set of brackets 12 comprises a pair of first brackets 50 and a pair of second brackets 52. For each first bracket 50, the third piece 40 is attached to and extends from the first lateral edge 42. Thus, each first bracket 50 is configured to be mounted to a respective one of a front left 110 mounting bolt 26 and a right rear 54 mounting bolt 26 of the skateboard 22 so that the second piece 38 of the first bracket 50 extends the third piece 40 toward a front left wheel 56 or a right rear wheel 58 of the skateboard 22, respectively. Similarly, for each second bracket 52, the third piece 40 is attached to and extends from the second lateral edge 44. Each second bracket 52 is configured to be mounted to a respective one of a front right 60 mounting bolt 26 and a left rear 62 mounting bolt 26 of the skateboard 22 so that the second piece 38 of the second bracket 52 extends the third piece 40 toward a front right wheel 64 or a left rear wheel 66 of the skateboard 22, respectively.

Figure 6:
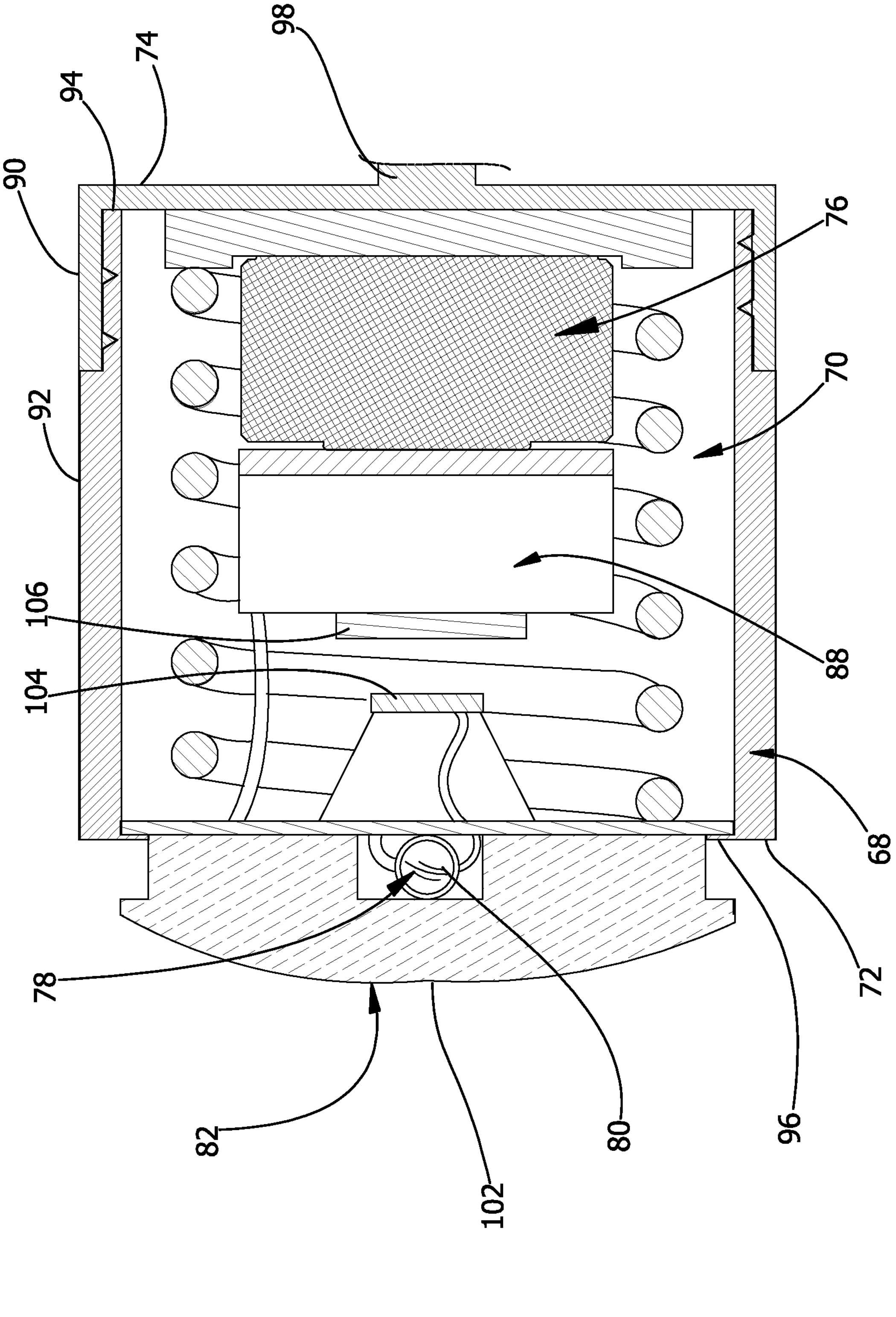
FIG. 6 is a cross-sectional view of an embodiment of the disclosure.
Figure 7:
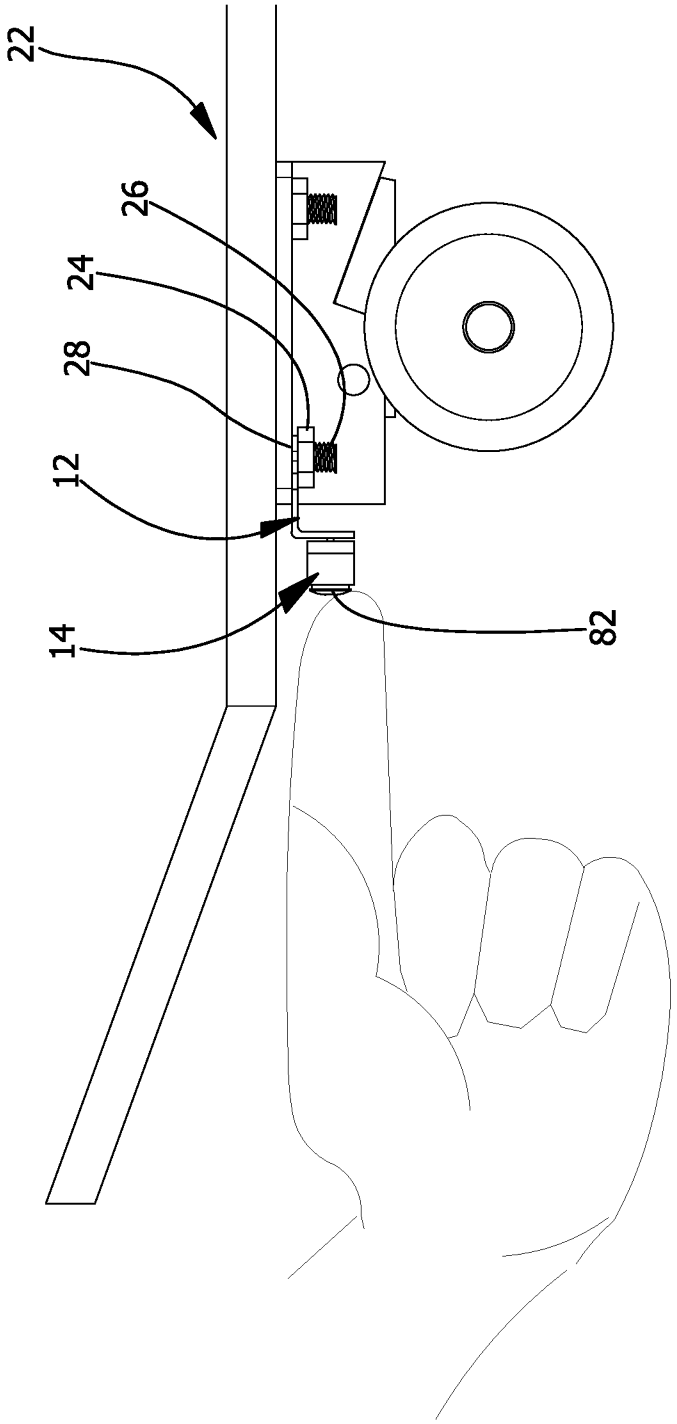
FIG. 7 is an in-use view of an embodiment of the disclosure.
Figure 8:
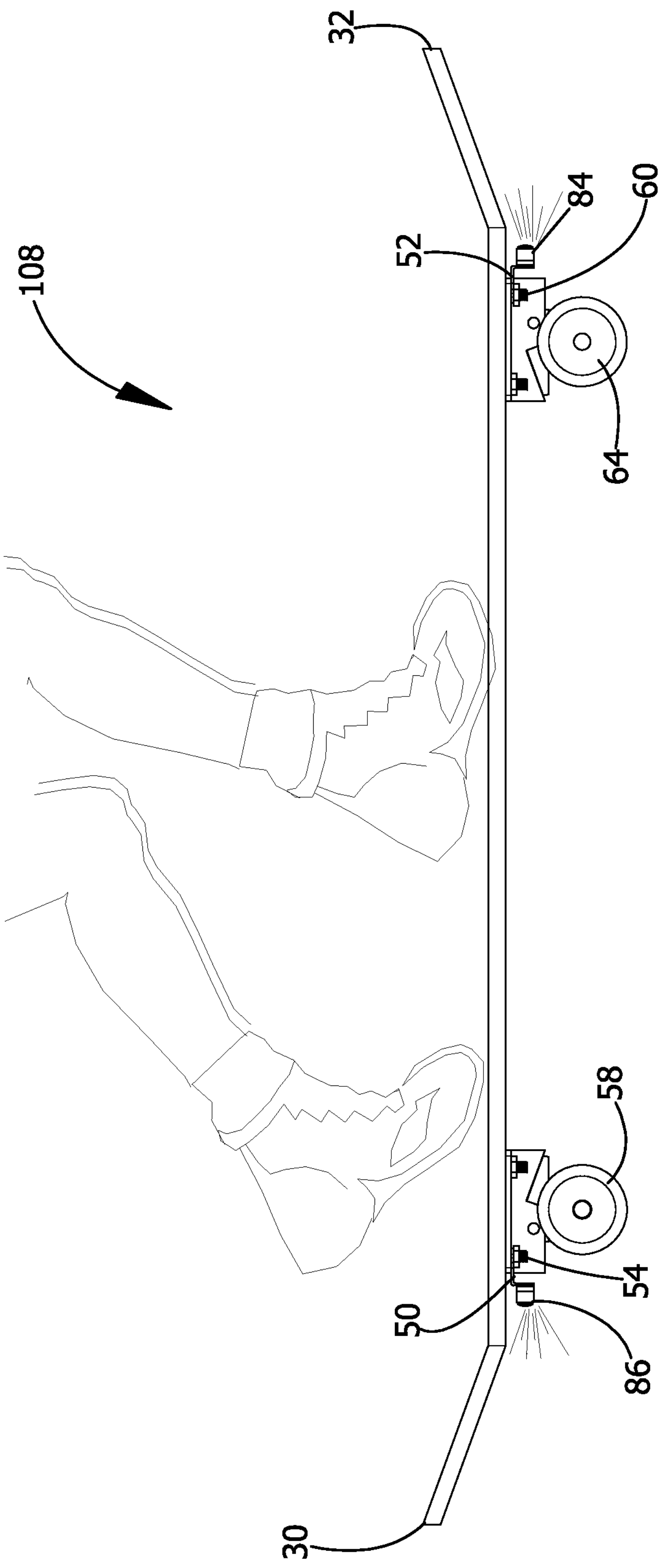
FIG. 8 is an in-use view of an embodiment of the disclosure.

Each light emitter 14 comprises a housing 68, which defines an interior space 70 and which has a front end 72 and a rear end 74. The housing 68 typically is substantially cylindrical, as is shown in FIG. 6, although alternative shapes for the housing 68 also are anticipated, such as, but not limited to, cuboid, triangular prismatic, or the like. A battery 76 is positioned in the interior space 70. A bulb 78 is attached to the front end 72 and is operationally engaged to the battery 76. The bulb 78 typically will comprise a light emitting diode 80. A switch 82 is attached to the housing 68 and is operationally engaged to the bulb 78 and the battery 76. The switch 82 is configured to be switched to selectively power the bulb 78.

The set of light emitters 14 generally comprises a pair of white emitters 84, which emit light forwardly of the deck 20 of the skateboard 22, and a pair of red emitters 86, which emit light rearwardly of the deck 20 of the skateboard 22. The light emitter 14 also may comprise a microprocessor 88, which is attached to the housing 68, positioned in the interior space 70, and operationally engaged to the bulb 78, the battery 76, and the switch 82. The microprocessor 88 is programmed to selectively actuate the bulb 78 in a plurality of modes. For example, the microprocessor 88 may be programmed to actuate the bulb 78 in a first mode, a second mode, and a third mode upon sequential switching of the switch 82, with the first mode being continuous illumination, the second mode being a first flashing mode, the third mode being a second flashing mode. A subsequent switching of the switch 82 would power off the bulb 78.

As is shown in FIG. 6, the housing 68 comprises a cap 90 and a tube 92. The cap 90 is attached to the bracket 12 and is internally threaded. The tube 92 has a first terminus 94 and a second terminus 96 and is externally threaded adjacent to the first terminus 94. The tube 92 thus is selectively threadedly couplable to the cap 90. The housing 68 also may be removably mounted to the bracket 12 by threading of a threaded stub 98 that protrudes from the cap 90 into a threaded hole 100 that is positioned in the bracket 12.

Also as is shown in FIG. 6, the switch 82 comprises a lens 102, which is attached to and positioned over the bulb 78. The lens 102 is spring loaded and is selectively depressible into the second terminus 96 of the tube 92. The lens 102 is biased to an extended position wherein the lens 102 extends from the housing 68. A first contact 104 is attached to the bulb 78 and a second contact 106 is attached to the microprocessor 88 so that depressing the lens 102 into the tube 92 brings the first contact 104 into contact with the second contact 106.

The present invention also includes a skateboard mounted illuminating system 108, which comprises a skateboard 22 and a skateboard mountable illuminating device 10, according to the specification above. The skateboard 22 comprises a deck 20, which has an underside 18, and a plurality of mounting bolts 26, which are attached to the skateboard 22 and which protrude from the underside 18. A pair of trucks 28 has been attached to the deck 20 using the plurality of mounting bolts 26 and a plurality of nuts 24. Each bracket 12 of a set of brackets 12 also has been mounted to the underside 18 of a deck 20 by insertion of a respective mounting bolt 26 through a mounting hole 16 in the bracket 12 and threading of a nut 24 onto the mounting bolt 26. The bracket 12 is the deck 20 and the nut 24. Each light emitter 14 of a set of light emitters 14 is attached to a respective bracket 12 and is configured to emit light either forwardly of the deck 20 for illumination and increased visibility or rearwardly of the deck 20 for increased visibility.

In use, respective nuts 24 used to secure a truck 28 to a deck 20 of a skateboard 22 are removed. A bracket 12 is abutted against truck 28 by inserting a respective mounting bolt 26 through a mounting hole 16 in the bracket 12. The truck 28 then is reattached to the underside 18 of the deck 20 using the nuts 24 so that the bracket 12 is positioned between the truck 28 and a nut 24. A user then can switch the switch 82 to actuate the light emitter 14 that is attached to the bracket 12 to emit light either forwardly of the deck 20 for illumination and increased visibility or rearwardly of the deck 20 for increased visibility, depending on the positioning of the bracket 12 upon mounting.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A skateboard mountable illuminating device comprising:

- a set of brackets, each bracket having a mounting hole positioned therein wherein the bracket is configured to be mounted to an underside of a deck of a skateboard using a nut and a respective mounting bolt integral to the skateboard such that the bracket is positioned between a truck of the skateboard and the nut;
- a set of light emitters, each light emitter being attached to a respective bracket wherein the light emitter is configured to emit light either forwardly of the deck for illumination and increased visibility or rearwardly of the deck for increased visibility; and
- wherein each light emitter comprises
  - a housing having a front end and a rear end, the housing defining an interior space,
  - a battery positioned in the interior space,
  - a bulb attached to the front end and being operationally engaged to the battery,
  - a switch attached to the housing and operationally engaged to the bulb and the battery, wherein the switch is configured for being switched to selectively power the bulb, and
  - a microprocessor attached to the housing, positioned in the interior space, and operationally engaged to the bulb, the battery, and the switch, the microprocessor being programmed for selectively actuating the bulbs in a plurality of modes.

2. The skateboard mountable illuminating device of claim 1, wherein the bracket has a cross-sectional profile, the cross-sectional profile being substantially L-shaped.

3. The skateboard mountable illuminating device of claim 1, wherein the set of brackets comprises four brackets such that the deck can be fitted with two brackets extending toward a rear end of the deck and two brackets extending toward a front end of the deck.

4. The skateboard mountable illuminating device of claim 1, wherein the set of light emitters comprises:

- a pair of white emitters emitting light forwardly of the deck of the skateboard; and
- a pair of red emitters emitting light rearwardly of the deck of the skateboard.

5. The skateboard mountable illuminating device of claim 1, wherein the bulb comprises a light emitting diode.

6. The skateboard mountable illuminating device of claim 1, wherein the housing is substantially cylindrical.

7. The skateboard mountable illuminating device of claim 6, wherein:

- the housing comprises:
  - a cap being attached to the bracket, the cap being internally threaded; and
  - a tube having a first terminus and a second terminus, the tube being externally threaded adjacent to a first terminus such that the tube is selectively threadedly couplable to the cap; and
- the switch comprises:
  - a lens attached to and positioned over the bulb, the lens being spring loaded such that the lens is selectively depressible into the second terminus of the tube and such that the lens is biased to an extended position wherein the lens extends from the housing;
  - a first contact being attached to the bulb; and
  - a second contact being attached to the microprocessor such that depressing the lens into the tube brings the first contact into contact with the second contact.

8. The skateboard mounted illuminating system of claim 1, wherein:

- the housing comprises:
  - a cap being attached to the bracket, the cap being internally threaded; and
  - a tube having a first terminus and a second terminus, the tube being externally threaded adjacent to a first terminus such that the tube is selectively threadedly couplable to the cap; and
- the switch comprises:
  - a lens attached to and positioned over the bulb, the lens being spring loaded such that the lens is selectively depressible into the second terminus of the tube and such that the lens is biased to an extended position wherein the lens extends from the housing;
  - a first contact being attached to the bulb; and
  - a second contact being attached to the microprocessor such that depressing the lens into the tube brings the first contact into contact with the second contact.

9. A skateboard mountable illuminating device comprising:

- a set of brackets, each bracket having a mounting hole positioned therein wherein the bracket is configured to be mounted to an underside of a deck of a skateboard using a nut and a respective mounting bolt integral to the skateboard such that the bracket is positioned between a truck of the skateboard and the nut; and
- a set of light emitters, each light emitter being attached to a respective bracket wherein the light emitter is configured to emit light either forwardly of the deck for illumination and increased visibility or rearwardly of the deck for increased visibility;
- wherein each bracket has a cross-sectional profile, the cross-sectional profile being substantially L-shaped, wherein each bracket comprises:
  - a first piece having a first lateral edge, a second lateral edge, a first end, and a second end, the mounting hole being positioned in the first piece proximate to the first end; and
  - a second piece attached to and extending substantially perpendicularly from the second end such that the second piece extends away from the deck upon mounting of the bracket to the deck.

10. The skateboard mountable illuminating device of claim 9, wherein each bracket comprises a third piece attached to and extending substantially coplanarly from a respective one of the first lateral edge and the second lateral edge, the second piece being attached to and extending substantially perpendicularly from the third piece distal from the first piece.

11. The skateboard mountable illuminating device of claim 10, wherein the set of brackets comprises:

a pair of first brackets wherein the third piece is attached to and extends from the first lateral edge, wherein each first bracket is configured for mounting to a respective one of a front left mounting bolt and a right rear mounting bolt of the skateboard such that the second piece of the first bracket extends the third piece toward a front left wheel or a right rear wheel of the skateboard, respectively; and a pair of second brackets wherein the third piece is attached to and extends from the second lateral edge, wherein each second bracket is configured for mounting to a respective one of a front right bolt and a left rear bolt of the skateboard such that the second piece of the second bracket extends the third piece toward a front right wheel or a left rear wheel of the skateboard, respectively.

12. A skateboard mountable illuminating device comprising:

a set of brackets, each bracket having a mounting hole positioned therein wherein the bracket is configured to be mounted to an underside of a deck of a skateboard using a nut and a respective mounting bolt integral to the skateboard such that the bracket is positioned between a truck of the skateboard and the nut, the bracket having a cross-sectional profile, the cross-sectional profile being substantially L-shaped; each bracket comprising:

a first piece having a first lateral edge, a second lateral edge, a first end, and a second end, the mounting hole being positioned in the first piece proximate to the first end;

a second piece attached to and extending substantially perpendicularly from the second end such that the second piece extends away from the deck upon mounting of the bracket to the deck; and a third piece attached to and extending substantially coplanarly from a respective one of the first lateral edge and the second lateral edge, the second piece being attached to and extending substantially perpendicularly from the third piece distal from the first piece;

the set of brackets comprising four brackets such that the deck can be fitted with two brackets extending toward a rear end of the deck and two brackets extending toward a front end of the deck;

the set of brackets comprising:

a pair of first brackets wherein the third piece is attached to and extends from the first lateral edge, wherein each first bracket is configured for mounting to a respective one of a front left mounting bolt and a right rear mounting bolt of the skateboard such that the second piece of the first bracket extends the third piece toward a front left wheel or a right rear wheel of the skateboard, respectively; and a pair of second brackets wherein the third piece is attached to and extends from the second lateral edge, wherein each second bracket is configured for mounting to a respective one of a front right bolt and a left rear bolt of the skateboard such that the second piece of the second bracket extends the third piece toward a front right wheel or a left rear wheel of the skateboard, respectively; and a set of light emitters, each light emitter being attached to a respective bracket wherein the light emitter is configured to emit light either forwardly of the deck for illumination and increased visibility or rearwardly of the deck for increased visibility, the set of light emitters comprising:

a pair of white emitters emitting light forwardly of the deck of the skateboard; and a pair of red emitters emitting light rearwardly of the deck of the skateboard;

each light emitter comprising:

a housing having a front end and a rear end, the housing defining an interior space, the housing being substantially cylindrical, the housing comprising:

a cap being attached to the bracket, the cap being internally threaded; and a tube having a first terminus and a second terminus, the tube being externally threaded adjacent to a first terminus such that the tube is selectively threadedly couplable to the cap;

a battery positioned in the interior space;

a bulb attached to the front end and being operationally engaged to the battery, the bulb comprising a light emitting diode;

a switch attached to the housing and operationally engaged to the bulb and the battery, wherein the switch is configured for being switched to selectively power the bulb, the switch comprising:

a lens attached to and positioned over the bulb, the lens being spring loaded such that the lens is selectively depressible into the second terminus of the tube and such that the lens is biased to an extended position wherein the lens extends from the housing;

a first contact being attached to the bulb; and a second contact being attached to the microprocessor such that depressing the lens into the tube brings the first contact into contact with the second contact; and a microprocessor attached to the housing, positioned in the interior space, and operationally engaged to the bulb, the battery, and the switch, the microprocessor being programmed for selectively actuating the bulbs in a plurality of modes.

13. A skateboard mounted illuminating system comprising:

a skateboard comprising:

a deck having an underside;

a plurality of mounting bolts attached to the skateboard and protruding from the underside; and a pair of trucks being attached to the deck using the plurality of mounting bolts and a plurality of nuts;

a set of brackets, each bracket having a mounting hole positioned, a respective mounting bolt being positioned through the mounting hole such that the bracket is mounted to the underside of a deck with the bracket being positioned between a truck of the skateboard and a respective nut;

a set of light emitters, each light emitter being attached to a respective bracket wherein the light emitter is configured to emit light either forwardly of the deck for illumination and increased visibility or rearwardly of the deck for increased visibility;

wherein the bracket has a cross-sectional profile, the cross-sectional profile being substantially L-shaped; and wherein each bracket comprises:

a first piece having a first lateral edge, a second lateral edge, a first end, and a second end, the mounting hole being positioned in the first piece proximate to the first end; and a second piece attached to and extending substantially perpendicularly from the second end such that the second piece extends away from the deck upon mounting of the bracket to the deck.

14. The skateboard mounted illuminating system of claim 13, wherein each bracket comprises a third piece attached to and extending substantially coplanarly from a respective one of the first lateral edge and the second lateral edge, the second piece being attached to and extending substantially perpendicularly from the third piece distal from the first piece.

15. The skateboard mounted illuminating system of claim 14, wherein the set of brackets comprises:

a pair of first brackets wherein the third piece is attached to and extends from the first lateral edge, each first bracket being mounted to a respective one of a front left mounting bolt and a right rear mounting bolt of the skateboard such that the second piece of the first bracket extends the third piece toward a front left wheel or a right rear wheel of the skateboard, respectively; and a pair of second brackets wherein the third piece is attached to and extends from the second lateral edge, each second bracket being mounted to a respective one of a front right bolt and a left rear bolt of the skateboard such that the second piece of the second bracket extends the third piece toward a front right wheel or a left rear wheel of the skateboard, respectively.

16. The skateboard mounted illuminating system of claim 13, wherein the set of brackets comprises four brackets such that the deck is fitted with two brackets extending toward a rear end of the deck and two brackets extending toward a front end of the deck.

17. The skateboard mounted illuminating system of claim 13, wherein the set of light emitters comprises:

a pair of white emitters emitting light forwardly of the deck of the skateboard; and a pair of red emitters emitting light rearwardly of the deck of the skateboard.

* * * * *